United States Patent [19]

Blumenthal

[11] Patent Number: 4,904,075
[45] Date of Patent: Feb. 27, 1990

[54] FLEXIBLE SPECTACLE FRAME
[75] Inventor: Oreste Blumenthal, Turin, Italy
[73] Assignee: Giuseppe Ratti Industria Ottica S.p.A., Turin, Italy
[21] Appl. No.: 215,759
[22] Filed: Jul. 6, 1988
[30] Foreign Application Priority Data Jul. 7, 1987 [IT] Italy .................. 67580 A/87

[51] Int. Cl.⁴ .................................................. G02C 5/16
[52] U.S. Cl. ...................................... 351/114; 351/113
[58] Field of Search ............ 351/114, 119, 117, 113; 2/448, 449, 450

[56] References Cited
U.S. PATENT DOCUMENTS
3,627,406 12/1971 Blumenthal .................. 351/114

Primary Examiner—Rodney B. Bovernick
Attorney, Agent, or Firm—Frost & Jacobs

[57] ABSTRACT

A spectacle frame comprising a front assembly and a pair of bows hinged to the front assembly and each having an elongated longitudinal core and a number of blocks arranged side by side and through which the aforementioned core is fitted. The frame also comprises a number of connecting elements, each located between a pair of blocks and each having a pair of opposed convex lateral surfaces and a pair of first ridges projecting perpendicularly to the core axis. Each block presents a pair of opposed concave surfaces designed to mate with respective convex surfaces on the connecting elements, and two pairs of second ridges, each facing a respective first ridge on a connecting element, so that, when the bow is flexed, the second ridges of each block on one side of the bow contact respective first ridges on the connecting elements.

10 Claims, 3 Drawing Sheets

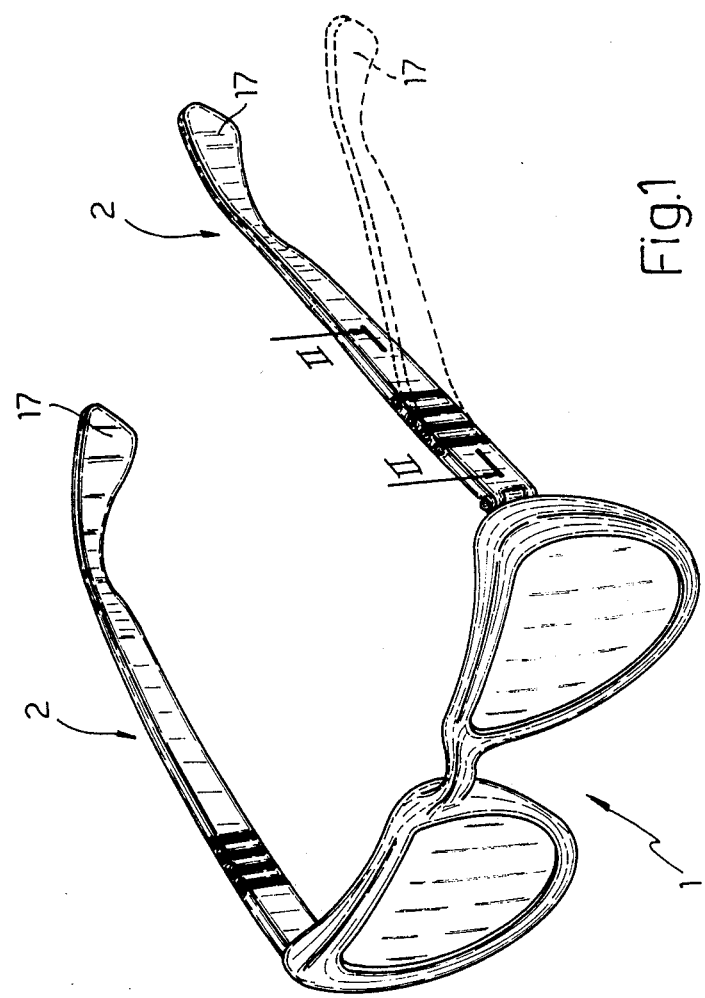

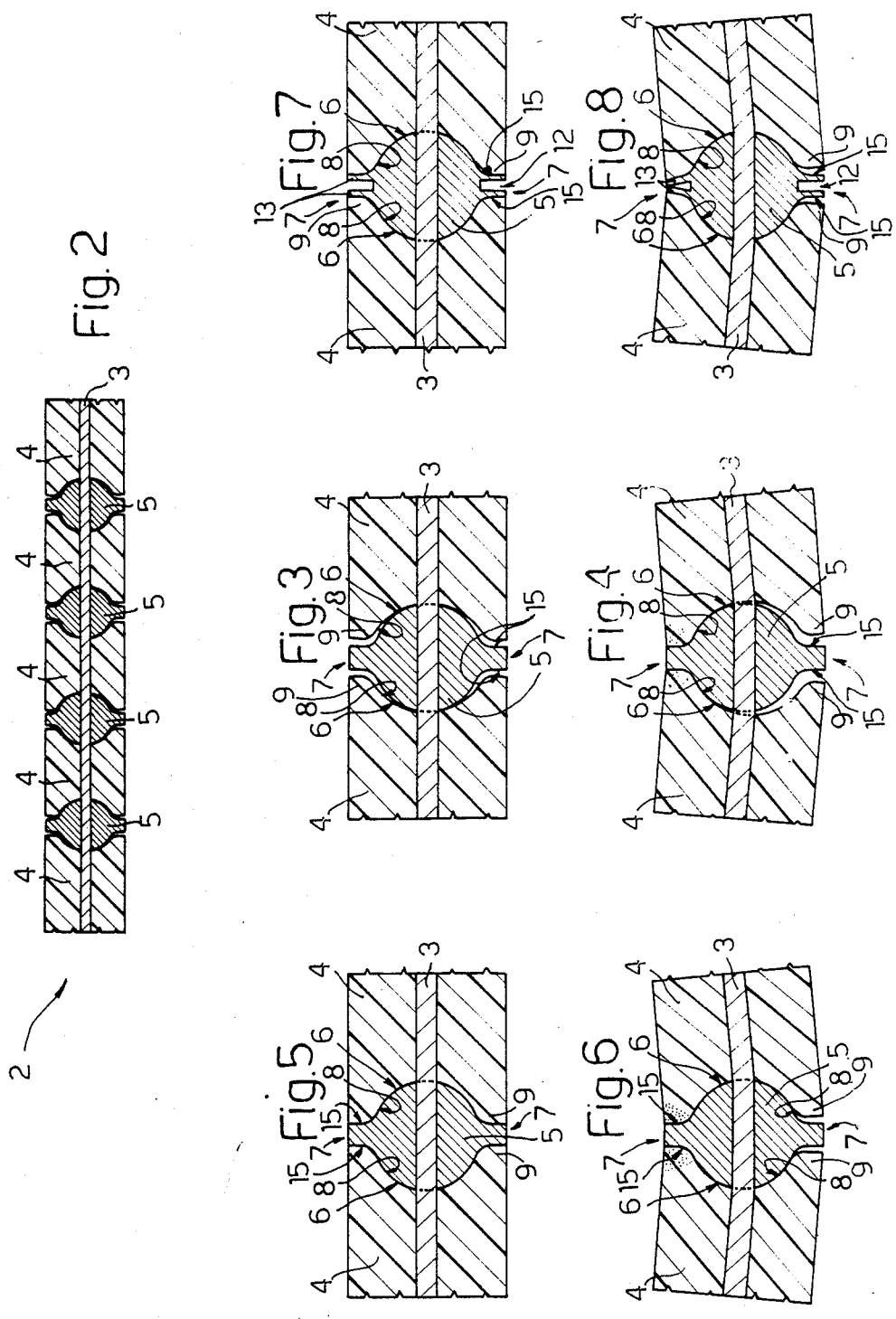

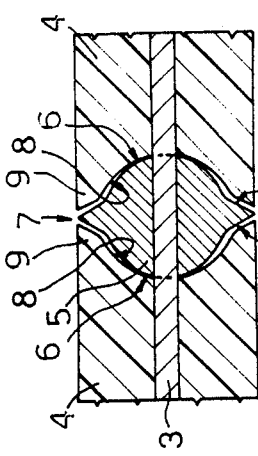
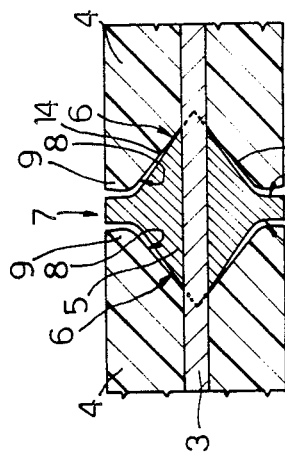
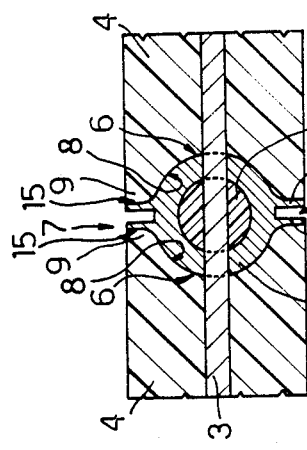

FLEXIBLE SPECTACLE FRAME

BACKGROUND OF THE INVENTION

The present invention relates to a spectacle frame comprising a front assembly for supporting the lenses, and a pair of flexible bows hinged to the front assembly and each comprising an elongated longitudinal core and a number of articulated elements arranged side by side and through which the said core is fitted.

On known frames, the said articulated elements are usually of two types: first articulated elements consisting of blocks, and second articulated elements consisting of cylinders, each of which is inserted between a pair of adjacent blocks with its axis substantially perpendicular to the longitudinal axis of the bow. Each block presents a pair of opposed lateral surfaces, each consisting of a cylindrical surface portion and designed to mate with the cylindrical surface of the adjacent cylinder.

On flexible bows of frames of the aforementioned type, two adjacent blocks are therefore separated by a cylinder so that, to enable flexure of the bow in the plane containing both bow axes, a fairly large gap must be left between adjacent blocks, which gap is gradually closed as the bow is flexed, so as to bring the said two adjacent blocks into contact with each other.

On other known spectacle frames, flexibility of the bows is improved by providing thin shells, usually of metal, between each cylinder and the two adjacent blocks. For enabling flexure of the bow, frames of this sort also present a fairly large gap between the shells enclosing each cylinder.

Frames of both the aforementioned types present a number of drawbacks.

Firstly, the flexibility of the bow may prove excessive by virtue of it depending solely on the rigidity of the core, which, being fairly small for enabling insertion inside the bow, is highly flexible. Due to the structure of the bows on frames of the aforementioned type, none of the articulated elements (cylinders and blocks) are flexed, but only the bow itself. If, on the other hand, a more rigid core is employed for overcoming the above drawback, this is either unacceptably large, or creates serious problems for inserting it inside the bow while at the same time maintaining the required bow section. A further drawback of frames of the aforementioned type is the infiltration of foreign substances, particularly liquid (e.g. perspiration), inside the gaps left between adjacent blocks for enabling flexure of the bow. In addition to such substances clogging the said gaps and thus preventing flexure of the bow, liquids may infiltrate between the cylinders and blocks and settle on the surface of the core which, being made of metal, is readily corrodable.

Finally, on frames of the aforementioned type, the elasticity of the bow is such as to prevent gradual flexure of the same. In fact, as bow flexibility depends solely on the flexibility of the core running through it, rigidity is substantially constant throughout flexure of the bow. As a result, flexing of the bow is arrested sharply upon closure of the gaps between adjacent blocks, thus resulting in possible breakage or permanent distortion of the articulated elements forming the bow.

SUMMARY OF THE INVENTION

The aim of the present invention is to provide a spectacle frame designed to overcome the aforementioned drawbacks, i.e. which presents fairly rigid bows with no need for large-size cores; which prevents infiltration of foreign substances between the articulated elements on the bow, thus preventing clogging of the same or corrosion of the core; and which provides for flexure with gradually increasing rigidity.

With these aims in view, according to the present invention, there is provided a spectacle frame comprising a front assembly for supporting the lenses, and a pair of bows hinged to the said front assembly; each said bow comprising an elongated longitudinal core, and a number of blocks arranged side by side and also fitted through with the same core; characterised by the fact that it comprises a number of connecting elements, each located between a pair of the said blocks or between one of the said blocks and part of the said bow, and each having a pair of opposed convex lateral surfaces, and a pair of first ridges projecting perpendicularly to the axis of the said core; each said block having a pair of opposed concave surfaces designed to mate with respective convex surfaces on the said connecting elements, and two pairs of second ridges, each facing a respective first ridge on a said connecting element, so that, when the said bow is flexed, the said second ridges on the said blocks on one side of the said bow contact respective first ridges on the said connecting elements.

BRIEF DESCRIPTION OF THE DRAWINGS

The present invention will be described by way of example with reference to the accompanying drawings, in which:

FIG. 1 shows a front view in perspective of the frame according to the present invention;

FIG. 2 shows a longitudinal section along line II—II of the flexible portion of the bow on the FIG. 1 frame;

FIGS. 3 and 4 show larger-scale views of a portion of the FIG. 2 bow in the normal and flexed position respectively;

FIGS. 5 and 6 show further bow portions in the normal and flexed position respectively, and relative to a further embodiment of the frame according to the present invention;

FIGS. 7 and 8 show sections of a bow portion in the normal and flexed position respectively, and relative to a further embodiment of the frame according to the present invention;

FIGS. 9 to 14 show sections of unflexed bow portions relative to further embodiments of the frame according to the present invention.

DETAILED DESCRIPTION OF THE INVENTION

The spectacle frame according to the present invention and as shown in FIG. 1 substantially comprises a front assembly 1 for supporting the lenses, and a pair of elongated bows 2 hinged to the said front assembly 1. The said bows 2 may be of any section, but are preferably rectangular, and formed from flexible material, e.g. plastic, such as acetate, celluloid or similar. Each bow 2 comprises an elongated longitudinal core 3 (FIG. 2), and a number of blocks 4 arranged side by side and also fitted through with the said core 3.

Bow 2 also comprises a number of connecting elements 5, each located between a pair of blocks 4, as shown in FIG. 2, or between a block 4 and one of the two remaining parts of the bow. As shown in FIG. 1, the articulated package consisting of blocks 4 and connecting elements 5 occupies a portion of the bow close to the end hinged to front assembly 1.

Each connecting element 5, as shown, for example, in FIGS. 2, 3 and 4, presents a pair of opposed convex lateral surfaces 6, and a pair of first ridges 7 projecting perpendicularly to the longitudinal axis of core 3. Each block 4 presents a pair of opposed concave surfaces 8, each designated to mate with a respective convex surface 6 on connecting element 5, and a two pairs of second ridges 9, each facing a respective first ridge 7 on a connecting element 5 between adjacent blocks 4, as shown in FIGS. 3 and 4. According to a first embodiment shown in FIGS. 2, 3 and 4, a small gap is left between ridges 7 on connecting elements 5 and ridges 9 on blocks 4, which gap tapers off gradually towards mating surfaces 6 and 8, as shown in FIG. 3. Though the said gap is preferable, for the reasons given later on, it is by no means indispensable, as shown in the FIG. 5 and 6 embodiment wherein the said mating surfaces 6 and 8 and ridges 7 of connecting elements 5 and ridges 9 of blocks 4 contact directly.

The width of each connecting element 5 with respective ridges 7 is conveniently and substantially the same as that of blocks 4, so that, in the unflexed position shown in FIGS. 3 and 5, the surfaces defining ridges 7 along the edges of bow 2 are flush with those defining blocks 4.

For enabling assembly of core 3, blocks 4 and connecting elements 5, provision is made on blocks 4 and connecting elements 5 for axial holes or slots through which core 3 is fitted.

In the FIG. 7 and 8 embodiment, each ridge 7 presents a slot 12 forming a pair of flexible tabs 13. The convex lateral surfaces 6 defining connecting elements 5 may be of any shape, in FIGS. 9 to 14. Each of the said surfaces conveniently of a cylindrical surface portion having a circumference as its directrix, as shown in FIGS. 2 to 10. Each of the said convex surfaces may, however, consist of a cylindrical surface portion having a directrix other than a circumference, as shown in Figs. 11, 12 and 13. In FIG. 11, connecting element 5 presents an elongated section crosswise of bow 2, whereas, in FIGS. 12 and 13, it presents an elongated section in the direction of core 3. Finally, each of convex surfaces 6 may consist of two flat surface portions 14 forming a dihedron as shown in FIG. 14.

In all the embodiments shown, ridges 7 of connecting elements 5 are conveniently defined by a pair of flat parallel surfaces 15, with the exception of FIGS. 11 and 13, in which the said flat surfaces, numbered 16, form a dihedral.

Connecting elements 5 may be formed from any material, preferably metal. The flexibility of the material used for blocks 4 is preferably, though not necessarily, greater than that employed for connecting elements 5. The chain of articulated elements consisting of blocks 4 and connecting elements 5 may be formed from any material of any rigidity, with no reduction in the flexibility of bow 2, as described later on. Chains of articulated elements may therefore be formed featuring blocks 4 and connecting elements 5 of the following materials: plastic-metal; metal-plastic; both plastic; both metal.

Each of bows 2 is flexed by simply applying sufficient pressure on end 17 to flex it in the plane containing the bow axes. This may be achieved in any manner, e.g. by simply resting end 17 on any part of the user3 s head. The effect of such pressure is to flex the bow portion featuring articulated elements 4 and 5, as shown by the dotted line in FIG. 1. Such flexing is achieved easily by virtue of the extreme flexibility of core 3 and the articulated elements of which bow 2 is composed. In the case of bow 2 as shown in the FIGS. 2, 3 and 4 embodiment, for example, flexing first results in closure of the gap between ridges 7 of connecting elements 5 and ridges 9 of blocks 4, with as yet no flexing of blocks 4 or connecting elements 5. Assuming the flexibility of the block 4 material is greater than that of connecting elements 5, further pressure produces localized flexing of the portion of ridges 9 of blocks 4 shown by the dotted line in FIG. 4. Such flexing is made possible by virtue of the elasticity of the block 4 material and the small size of ridges 9, which permit further flexing by substantially only compressing ridges 9 of blocks 4. As flexing continues, the rigidity of bow 2 obviously increases, thus producing an elastic reaction which tends to resist, and increases gradually alongside, further flexing of the bow. Bow 2 is thus flexed gradually until sufficient rigidity is produced for preventing it from being flexed further. When the pressure on end 17 is removed, each bow 2 returns to the unflexed position shown in FIGS. 2 and 3, by virtue of both ridges 9 and core 3 springing back to the original unflexed position. The same applies to the FIG. 5 and 6 embodiment, with the exception of the gap take-up stage between ridges 7 and 9 which, in this case, contact directly.

Flexing of bow 2 as shown in the FIGS. 7 and 8 embodiment substantially depends on the flexibility of tabs 13 on ridges 7, in which case, blocks 4 may be formed from less flexible material.

The same applies to connecting elements 5 having convex surfaces 6 as shown in FIGS. 11 to 14.

Each connecting element 5 may also be provided with a cylinder 18 having its axis perpendicular to core 3 and inserted in a respective axial hole on connecting element 5, in which case, the said cylinder 18 is also fitted through with core 3, as shown in FIGS. 9 and 10.

In addition to local flexing of ridges 9 on blocks 4 and tabs 13 on ridges 7, flexing of bow 2 is accompanied by mutual rotation of blocks 4 and connecting elements 5, which rotation may be further improved by leaving a small gap (not shown) between core 3 and the respective surfaces of the holes on blocks 4 and connecting elements 5 through which core 3 is fitted.

The flexible spectacle frame according to the present invention clearly provides for a high degree of flexibility of bows 2 while at the same time overcoming the aforementioned drawbacks associated with known frames.

In particularly, such flexibility of bows 2 may be achieved using a very small core 3, by virtue of it depending solely on the flexibility of the block 4 and connecting element on 5 material, as already explained. Furthermore, increasing flexure of bow 2 is accompanied by a gradually increasing elastic reaction, which provides for gradually arresting flexure of bow 2 and thus preventing breakage or damage to the articulated elements on the same. Finally, the frame according to the present invention prevents infiltration of foreign substances, particularly liquid, between the mating surfaces of the articulated elements on the bow, by virtue of the very small gap between the same. If necessary, this sealing function may be further improved by dispensing entirely with the said gap, as on a number of embodiments shown.

To those skilled in the art it will be clear that changes may be made to the spectacle frame as described and illustrated herein without, however, departing from the scope of the present invention.

I claim:

1. A spectacle frame comprising a front assembly (1) for supporting the lenses, and a pair of bows (2) hinged to said front assembly (1); each said bow (2) comprising an elongated longitudinal core (3), and a plurality of blocks (4) arranged side-by-side with said core (3) extending centrally through each said block (4); characterized in that a plurality of unitary connecting elements (5) are located between a pair of said blocks (4) or between one of said blocks and an adjoining part of said bow (2), each of said blocks (4) being mounted on said core (3) and having a pair of opposed convex lateral surfaces (6), and an opposing pair of first ridges (7) projecting perpendicularly to the axis of the said core (3); each said block (4) having a pair of opposed concave surfaces (8) designed to mate directly with respective concave surfaces (6) on said connecting elements (5) and pairs of second ridges (9), each facing a respective first ridge (7) on said connecting elements (5), at least one of said first (7) and second (9) ridges being elastically deformable so that when said bow (2) is flexed, at least one of said first and second ridges on one side of the said bow will be gradually elastically deformed in order to follow the deformation of the said bow (2).

2. A spectacle frame as claimed in claim 1, characterised by the fact that the said blocks (4) and the said connecting elements (5) are formed from flexible material.

3. A spectacle frame as claimed in claim 1, characterised by the fact that the flexibility of the said material of the said blocks (4) is greater that that of the said connecting elements (5).

4. A spectacle frame as claimed in claim 1, characterised by the fact that each of the said first ridges (7) on the said connecting elements (5) presents a pair of flexible tabs (13).

5. A spectacle frame as claimed in claim 1, characterised by the fact that a gap is left between the said lateral surfaces (6) on the said connecting elements (5) and the respective lateral surfaces (8) on the said blocks (4) and between the said first ridges (7) on the said connecting element (5) and the said second ridges (5) on the said blocks (4).

6. A spectacle frame as claimed in claim 1, characterised by the fact that each of the said lateral surfaces (6) on the said connecting elements (5) is a cylindrical surface portion having any curve as its directrix.

7. A spectacle frame as claimed in claim 1, characterised by the fact that each of the said lateral surfaces (6) on the said connecting elements (5) comprises two flat surfaces portions (14) forming a dihedron.

8. A spectacle frame as claimed in claim 1, characterised by the fact that each of the said first ridges (7) on the said connecting elements (5) is defined by a pair of flat parallel surfaces (15).

9. A spectacle frame as claimed in claim 1, characterised by the fact that each of the said first ridges (7) on the said connecting elements (5) is defined by a pair of flat surfaces (16) forming a dihedral.

10. A spectacle frame as claimed in claim 1, characterised by the fact that each of the said connecting elements (5) presents a hole or slot having its axis perpendicular to that of the said core (3) and through which is inserted a closing element (18) also fitted through with the said core (3).

* * * * *